(12) United States Patent
Arent et al.

(10) Patent No.: US 7,171,755 B1
(45) Date of Patent: Feb. 6, 2007

(54) PICTURE HANGING LEVEL

(76) Inventors: Richard Arent, 515 Broad, Suite 201, Menasha, WI (US) 54952; Dennis Wordell, N2080 Tear Trail, Hortinville, WI (US) 54944

( * ) Notice: Subject to any disclaimer, the term of this patent is extended or adjusted under 35 U.S.C. 154(b) by 0 days.

(21) Appl. No.: 10/869,090

(22) Filed: Jun. 16, 2004

Related U.S. Application Data

(60) Provisional application No. 60/479,779, filed on Jun. 18, 2003.

(51) Int. Cl.
*G01B 9/00* (2006.01)
*B43L 7/027* (2006.01)

(52) U.S. Cl. .............................. 33/194; 33/451; 33/371; 33/613

(58) Field of Classification Search ................. 33/194, 33/613, 371, 535, 562, 474, 451, 47, 481
See application file for complete search history.

(56) References Cited

U.S. PATENT DOCUMENTS

| | | | | |
|---|---|---|---|---|
| 1,845,801 A | * | 2/1932 | Kupferman | ................. 33/375 |
| 4,208,802 A | * | 6/1980 | Berndt | ........................ 33/347 |
| 4,473,957 A | * | 10/1984 | Faulkner | ..................... 33/666 |
| 4,745,689 A | | 5/1988 | Hiltz | |
| 4,761,890 A | | 8/1988 | Morrell | |
| 4,944,094 A | * | 7/1990 | Depiano et al. | ............... 33/371 |
| 5,174,034 A | * | 12/1992 | Swanda | ....................... 33/365 |
| 5,253,426 A | * | 10/1993 | Mosbrucker | ................. 33/429 |
| 5,353,509 A | | 10/1994 | Black | |
| 5,524,353 A | * | 6/1996 | Fink | ............................. 33/451 |
| 5,802,729 A | * | 9/1998 | O'Brien et al. | ............... 33/371 |
| 5,813,125 A | * | 9/1998 | Byrn | ........................... 33/451 |
| 6,029,359 A | * | 2/2000 | Szumer | ....................... 33/373 |
| 6,032,378 A | * | 3/2000 | Null | .............................. 33/613 |
| 6,138,369 A | * | 10/2000 | Mushin | ....................... 33/379 |
| 6,205,669 B1 | | 3/2001 | Sollars et al. | |
| 6,739,065 B2 | * | 5/2004 | Hofmeister et al. | .......... 33/613 |
| 6,752,370 B2 | * | 6/2004 | Gonzales | ...................... 33/371 |
| 6,839,973 B1 | * | 1/2005 | Woodward | .................... 33/371 |
| 2002/0066199 A1 | * | 6/2002 | Hanson | ....................... 33/613 |
| 2005/0022397 A1 | * | 2/2005 | Neblo | .......................... 33/194 |

* cited by examiner

*Primary Examiner*—Yaritza Guadalupe-McCall
(74) *Attorney, Agent, or Firm*—Boyle, Fredrickson, Newholm, Stein & Gratz, S.C.

(57) ABSTRACT

A level designed for use in hanging pictures is disclosed. The level is proportioned to be easy and convenient to use in conjunction with a picture frame, having a pair of perpendicular legs that can rest on a corner of a picture frame and a level vial positioned within one of the legs. The level can be used to help guide the mounting of a frame on the wall or may be used to check the placement of an already-mounted frame and adjust the frame as needed.

11 Claims, 2 Drawing Sheets

PICTURE HANGING LEVEL

This application claims priority from U.S. Provisional Patent Application Ser. No. 60/479,779, which was filed Jun. 18, 2003.

BACKGROUND OF THE INVENTION

The present invention relates to a levels, and more particularly, relates to a level that is well suited for hanging pictures or other objects on a wall or the like.

Conventional carpenter levels containing an air bubble in a liquid-containing vial are well-known in the prior art, for determining the attitude of an object relative to level or plumb. Such carpenter levels are relatively long and unwieldy, since they require a relatively long gauging surface to provide accurate readings in use. Thus, while a conventional level can be used in hanging a picture or the like on a wall or other vertical surface, to ensure that the picture is not crooked, it is often difficult or impractical to manage the level in relation to a picture frame, due to the length of the level. Furthermore, a conventional level does not include any convenient way to coordinate hanging of the frame and use of the level.

It is an object of the present invention to provide a level device that is well suited for use in hanging a picture or other object on a wall or the like. It is another object of the invention to provide such a level device that is relatively small and lightweight, and is therefore easy to manipulate and use when hanging a picture or the like. Yet another object of the invention is to provide such a level device that is relatively simple and cost-effective to manufacture. A still further object of the invention to provide such a level device that is capable of being retained on the picture or the like when in use. Yet another object of the invention is to provide such a level device that includes a feature by which the use is able to quickly ascertain the position of the level device relative to the picture or the like.

SUMMARY OF THE INVENTION

In accordance with the present invention, a level device has a first leg with a recess or opening for a level vial. A level vial is mounted in the opening. The level device has a second leg that extends generally perpendicular to the first leg. The first and second legs are preferably formed as a single unit. The first and second legs define perpendicular inner surfaces that form a square bracket configuration, for placement on the corner defined by a picture frame. The level may additionally have a finger grip to facilitate manual engagement of the level device and manipulation of the level device during use.

The level device is adapted to be used by placing the square bracket configuration defined by the inner surfaces of the legs onto a corner of a picture frame, and then positioning and mounting the picture frame on a wall using the level device as a guide. The level device may also be used after the picture has been mounted on the wall to adjust the frame as needed.

The present invention overcomes the drawbacks of using a standard level for hanging a picture frame or the like on a wall or other vertical surface, by having a relatively small size and being shaped to remain in engagement with a picture frame manner while the picture is being leveled. The size of the level device makes it easy to store in a convenient location, easy to carry from location to location, and easy to use in conjunction with a picture frame. The shape of the device allows the user to place it on the corner of the picture frame and to ensure that the level device is engaged with the picture frame, thus providing a convenient, hands-free method of hanging a picture or the like using the level device.

BRIEF DESCRIPTION OF THE DRAWINGS

Preferred exemplary embodiments and the best mode presently contemplated of carrying out the invention are illustrated in the accompanying drawings, in which like reference numerals represent like parts throughout, and in which.

DETAILED DESCRIPTION OF THE PREFERRED EMBODIMENTS

Figure 1:
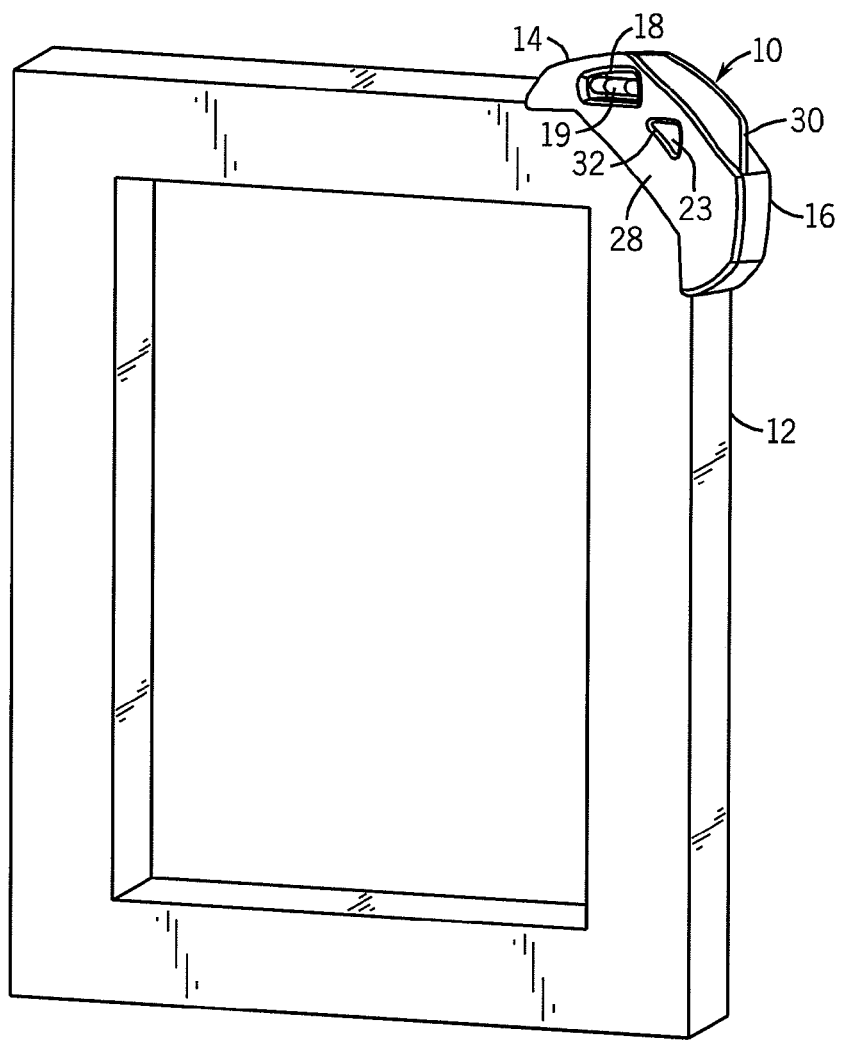
FIG. 1 is an isometric view of a preferred embodiment of a level device in accordance with the present invention, shown in engagement with a picture frame for use in leveling the picture frame on a wall or other vertical surface.
Figure 4:
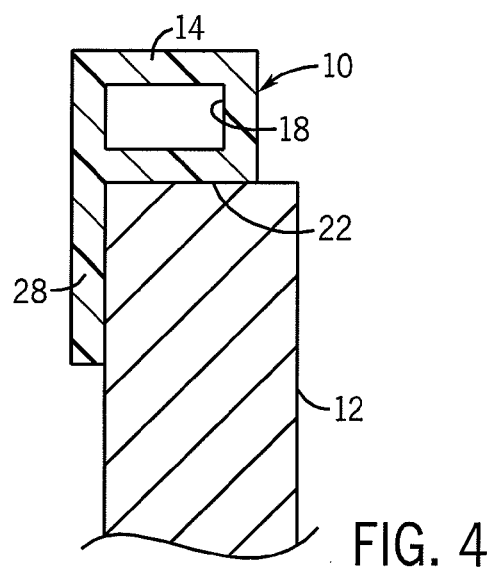
FIG. 4 is a partial section view taken along lines 4—4 of FIG. 2.
Figure 2:
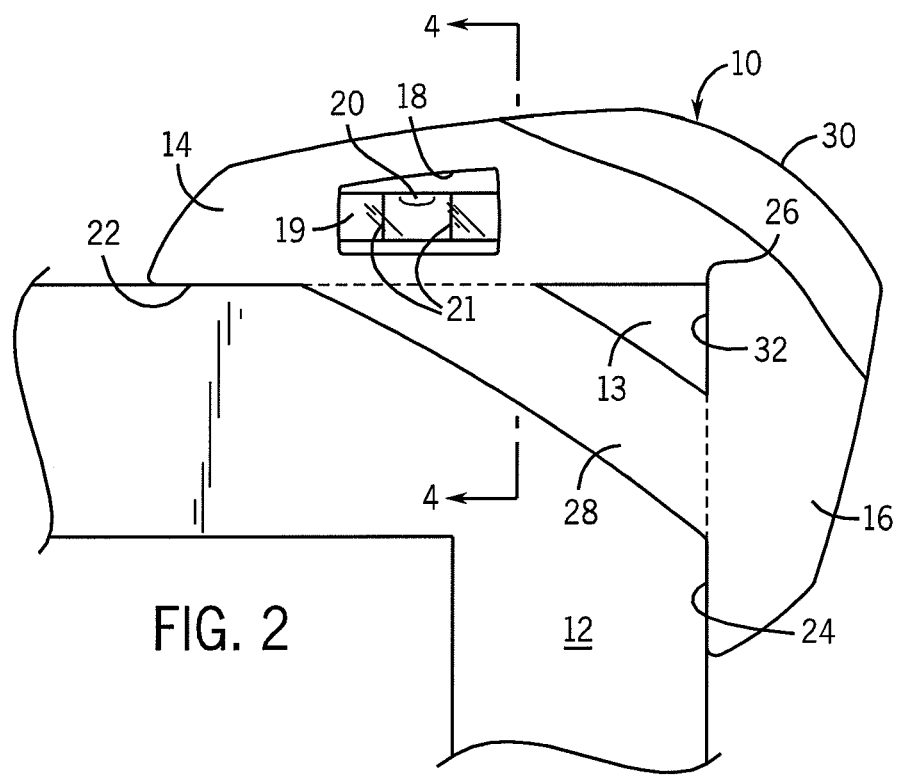
FIG. 2 is an enlarged front elevation view of the level device of FIG. 1 and a portion of the picture frame.
Figure 3:
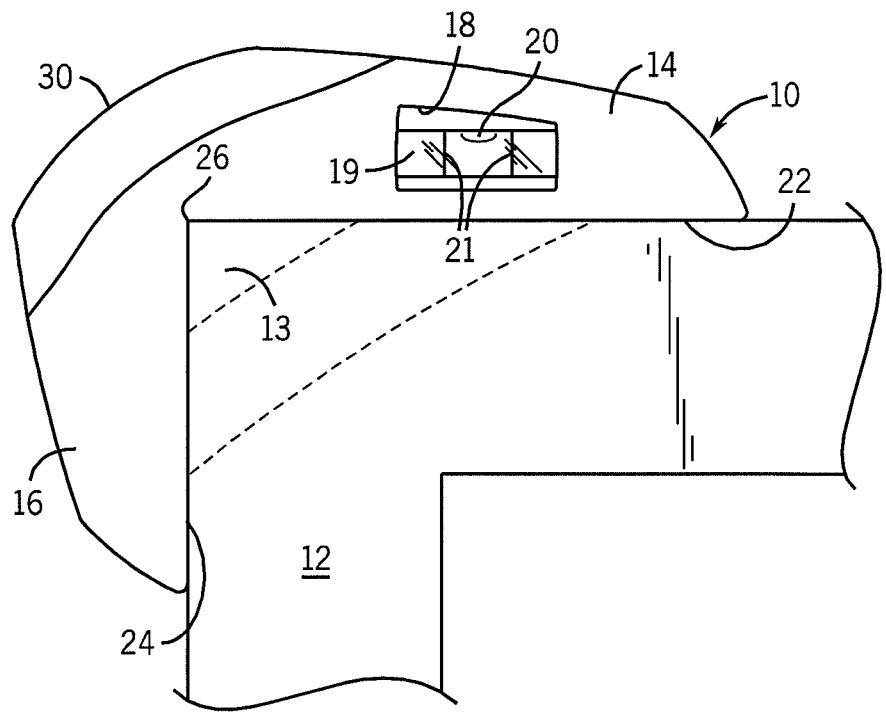
FIG. 3 is a rear elevation view of the level device of FIG. 1 and a portion of the picture frame.

Referring to FIGS. 1–4, a level device, in the form of a picture hanging level 10, is used in conjunction with a picture frame 12 to hang frame 12 having a corner 13 on a wall (not shown) or other vertical surface. Level 10 has a first leg 14 and a second leg 16. First leg 14 has an opening 18 in which a level vial 19 is positioned. While the drawings illustrate opening 18 as extending completely between the front and the back of level 10, it is also understood that vial 19 may be positioned within a recess formed in the front of level 10 that does not completely extend throughout the thickness of first leg 14.

Level vial 19 extends along a longitudinal axis that is parallel to the plane of inner surface 22 of first leg 14. Level vial 19 contains a bubble 20 and includes a pair of lines 21 between which bubble 20 is located when level vial 19 is situated in a level orientation, to indicate that frame 12 on which level 10 is resting is also level. Level vial 19 is preferably constructed of an acrylic or other plastic material, in a manner as is known, and may be molded into first leg 14, as discussed below.

First leg 14 has a flat inner surface 22 and second leg has a flat inner surface 24 that meet at a junction 26 to form a 90 degree angle. A face member 28 and a finger grip 30 may also be provided on level 10. Face member 28 cooperates with legs 14 and 16 to define an opening 32 through which junction 26 and the adjacent areas of inner surfaces 22 and 24 are visible from the front of level 10. The areas of inner surfaces 22 and s4 adjacent junction 26 define the perpendicular side edges of opening 32, and the other edge of opening 32 is defined by the upper surface of face member 28, In this manner, when level 10 is properly engaged with picture frame 12, opening 32 allows a user to see that a corner 13 of frame 12 is situated in junction 26.

Level 10 is preferably constructed by injection molding legs 14, 16 as a single unit, although it is understood that any other satisfactory forming method may be employed. During the injection molding process, vial 19 may be insert molded into first leg 14. Alternatively, leg 14 may be provided with any satisfactory vial-mounting structure, and vial 19 may be engaged with leg 14 in a separate operation subsequent to molding of legs 14 and 16. Face member 28 and finger grip 30 may also be formed in the injection molding process that is used to form legs 14, 16, but could also be separately molded and attached to legs 14, 16 in any suitable manner.

In the preferred embodiment, each of legs 14, 16 is ½" wide, meaning that surfaces 22, 24 are also ½" wide. This width allows level 10 to remain compact and manageably-sized, but also able to rest securely on corner 13 of frame 12. Face member 28 is preferably ⅛" thick, and finger grip 30, which is located adjacent to face member 28 and extends between legs 14, 16, is also preferably ⅛" thick.

In use, a person wishing to hang a frame or the like on a wall or other vertical surface places level 10 on the corner 13 of frame 12. The user ensures that level 10 is in place by checking to be sure that corner 13 can be seen through opening 32 in engagement with junction 26. The user can then mount frame 12 on the wall using level 10 as a guide in positioning frame 12. Alternately, level 10 can be used after a frame 12 is mounted on a wall, by placing the level on corner 13 of the mounted frame 12 and adjusting frame 12 until bubble 20 within vial 19 rests between lines 21. During use, the user is able to level frame 12 using both hands, since level 10 is configured to remain in engagement with corner 13 of frame 12 once in position. Face member 28 engages the front surface of frame 12, to maintain level 10 in position in a front-rear direction on frame 12, while the top and side surfaces of frame 12 remain in engagement with inner surfaces 22, 24 of legs 14, 16, respectively. Opening 32 enables the user to visually ensure that level 10 remains in proper position during the entire leveling operation.

Other alternatives and modifications are contemplated as being within the scope of the invention, in addition to those mentioned above. For example, and without limitation, level vial 19 may be mounted in any location on level 10, including second leg 16 or the corner area between first leg 14 and second leg 16. Further, while opening 32 is illustrated as being triangular, it is understood that opening 32 may have any other shape, so long as visual access to corner 26 is provided. In addition, while level 10 is shown as being configured for engagement with a right hand corner of a picture or the like, it is also contemplated that level 10 may have a mirror image construction in which level 10 is engageable with a left hand corner of a picture or the like. Further, it should be understood that level 10 may be constructed to define inner surfaces that cooperate to engage a picture frame or the like having any configuration other than a right angle corner as shown and described. In general, level 10 is constructed to have an upper surface that rests on an upper edge of the picture or the like, and a vertical surface extending from the upper surface for engagement with a side edge of the picture or the like.

Various alternatives and embodiments are contemplated as being within the scope of the following claims particularly pointing out and distinctly claiming the subject matter regarded as the invention.

We claim:

1. A level device for leveling an object such as a frame having at least one corner defined by an outer surface of a horizontal frame member and an outer surface of a vertical frame member, comprising:
   a first leg having a horizontal inner surface;
   a second leg having a vertical inner surface perpendicular to the horizontal inner surface of the first leg; and
   a horizontal level indicating member carried by one of the first and second legs and extending along a longitudinal axis, wherein the level indicating member is oriented such that the longitudinal axis of the level indicating member extends parallel to the horizontal inner surface of the first leg and perpendicular to the vertical inner surface of the second leg;
   wherein the horizontal and vertical inner surfaces of the first and second legs, respectively, are engageable with the outer surfaces of the respective horizontal and vertical frame members of the frame, and wherein the horizontal level indicating member extends parallel to the outer surface of the horizontal frame member when the inner surfaces of the first and second legs are engaged with the outer surfaces of the horizontal and vertical members of the frame, and is operable to indicate the relationship of the horizontal frame member to level; and
   a finger grip interconnected with and extending from one of the first and second legs, wherein the finger grip comprises a vertically extending tab member extending outwardly from outer surfaces defined by the first and second legs.

2. The level device of claim 1, wherein the inner surfaces of the first and second legs define a corner configured for placement on a corner defined by the outer surfaces of the horizontal and vertical surfaces of the frame.

3. A level device for leveling an object such as a frame having at least one corner defined by an outer surface of a horizontal frame member and an outer surface of a vertical frame members comprising:
   a first leg having an inner surface;
   a second leg having an inner surface perpendicular to the inner surface of the first leg, wherein the inner surfaces of the first and second legs define a corner configured for placement on a corner defined by the outer surfaces of the horizontal and vertical surfaces of the frame;
   a level indicating member carried by one of the first and second legs and extending along a longitudinal axis, wherein the level indicating member is oriented so as to extend parallel to the inner surface of the first leg and perpendicular to the inner surface of the second leg;
   wherein the inner surfaces of the first and second legs are engageable with the outer surfaces of the horizontal and vertical frame members of the frame, and wherein the level indicating member extends parallel to the outer surface of the horizontal frame member when the inner surfaces of the first and second legs are engaged with the outer surfaces of the horizontal and vertical members of the frame, and is operable to indicate the relationship of the horizontal frame member to level; and
   a face member interconnected with the first and second legs, wherein the face member extends between the first and second legs inwardly of the corner defined by the inner surfaces of the first and second legs, wherein the face member contacts an outwardly facing surface of the frame to locate the level device on the frame when the corner defined by the inner surfaces of the first and second legs is placed on the corner defined by the outer surfaces of the horizontal and vertical surfaces of the frame.

4. The level device of claim 3, wherein the face member has an opening that is at least partially coextensive with the inner surfaces of the first and second legs such that the corner defined by the outer surfaces of the frame members can be seen through the opening when the level device is positioned such that the corner defined by the inner surfaces of the first and second legs is placed on the corner defined by the outer surfaces of the horizontal and vertical surfaces of the frame.

5. A method of hanging a picture having a frame, wherein the frame has at least one corner defined by an outer surface of a horizontal frame member and an outer surface of a vertical frame member, comprising the steps of:
providing a picture hanging level including a first leg having an inner surface; a second leg having an inner surface perpendicular to the inner surface of the first leg; and a level indicating member carried by one of the first and second legs and extending along a longitudinal axis, wherein the level indicating member is oriented such that the longitudinal axis of the level indicating member extends parallel to the inner surface of the first leg and perpendicular to the inner surface of the second leg;
placing the picture hanging level the picture frame such that the inner surfaces of the first leg rests on the outer surface of the horizontal frame member and the inner surface of the second leg faces the outer surface of the vertical frame member, wherein the longitudinal axis of the level indicating member extends parallel to the outer surface of the horizontal frame member when the inner surfaces of the first rests on the outer surface of the horizontal frame member; and
adjusting the picture frame on a wall using the level as a guide to indicate the relationship of the horizontal frame member to level.

6. The method of claim 5, further comprising the step of manipulating the level using a finger grip interconnected with and extending from one of the first and second legs.

7. The method of claim 5, wherein the first and second legs of the level are formed integrally with each other and wherein the inner surfaces of the first and second legs define a corner, and wherein the step of placing the level on the corner of the picture frame is carried out by engaging the corner of the frame within the corner defined by the inner surfaces of the first and second legs of the level.

8. The method of claim 7, wherein the level includes a face member interconnected with the first and second legs, wherein the face member extends between the first and second legs inwardly of the corner defined by the inner surfaces of the first and second legs, and wherein the step of placing the level on the picture frame is carried out by contacting the face member with an outwardly facing surface of the frame to locate the level on the frame when the corner defined by the outer surfaces of the horizontal and vertical surfaces of the frame is engaged within the corner defined by the inner surfaces of the first and second legs.

9. The method of claim 8, further comprising the step of visually checking that the level is square with the frame by viewing the corner defined by the outer surfaces of the frame members through an opening in the face member that is at least partially coextensive with the inner surfaces of the first and second legs.

10. A method of hanging a picture having a frame, wherein the frame has at least one corner defined by an outer surface of a horizontal frame member and an outer surface of a vertical frame member, comprising the steps of:
providing a picture hanging level including a first leg having an inner surface; a second leg having an inner surface perpendicular to the inner surface of the first leg, wherein the first and second legs of the level are formed integrally with each other and wherein the inner surfaces of the first and second legs define a corner; a level indicating member carried by one of the first and second legs and extending along a longitudinal axis, wherein the level indicating member is oriented so as to extend parallel to the inner surface of the first leg and perpendicular to the inner surface of the second leg; and a face member interconnected with the first and second legs, wherein the face member extends between the first and second legs inwardly of the corner defined by the inner surfaces of the first and second legs;
placing the picture hanging level on the corner of the picture frame by engaging the corner of the frame within the corner defined by the inner surfaces of the first and second legs of the level, wherein the level indicating member extends parallel to the outer surface of the horizontal frame member when the inner surfaces of the first and second legs are engaged with the corner of the picture frame, and wherein the step of placing the level on the corner of the picture frame includes contacting the face member with an outwardly facing surface of the frame to locate the level on the frame when the corner defined by the outer surfaces of the horizontal and vertical surfaces of the frame is engaged within the corner defined by the inner surfaces of the first and second legs; and
adjusting the picture frame on a wall using the level as a guide to indicate the relationship of the horizontal frame member to level.

11. The method of claim 10, further comprising the step of visually checking that the level is square with the frame by viewing the corner defined by the outer surfaces of the frame members through an opening in the face member that is at least partially coextensive with the inner surfaces of the first and second legs.

* * * * *

UNITED STATES PATENT AND TRADEMARK OFFICE
CERTIFICATE OF CORRECTION

| | | |
|---|---|---|
| PATENT NO. | : 7,171,755 B1 | Page 1 of 1 |
| APPLICATION NO. | : 10/869090 | |
| DATED | : February 6, 2007 | |
| INVENTOR(S) | : Richard Arent et al. | |

It is certified that error appears in the above-identified patent and that said Letters Patent is hereby corrected as shown below:

IN THE CLAIMS

CLAIM 3, column 4, line 27, delete "members" and substitute therefore -- member, --;

CLAIM 5, column 5, line 15, after "level" insert -- on --;

CLAIM 5, column 5, line 22, after "first" insert -- leg --.

Signed and Sealed this

Fourth Day of November, 2008

JON W. DUDAS
*Director of the United States Patent and Trademark Office*